Oct. 21, 1969  A. PITNER  3,473,855
GREASING OF A NEEDLE BEARING HAVING A CLOSED END
Filed Nov. 28, 1967
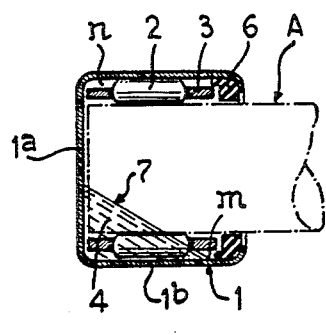

United States Patent Office 3,473,855
Patented Oct. 21, 1969

3,473,855
GREASING OF A NEEDLE BEARING HAVING A CLOSED END
Alfred Pitner, Paris, France, assignor of one-half to Nadella S.A., Rueil-Malmaison, France, a French body corporate
Filed Nov. 28, 1967, Ser. No. 686,158
Claims priority, application France, Jan. 19, 1967, 91,717
Int. Cl. F16c 1/24, 33/72
U.S. Cl. 308—187                                    2 Claims

ABSTRACT OF THE DISCLOSURE

A needle bearing structure comprising a cup having a blind end and an inner cylindrical face, needles inside the cup and a mass of grease necessary for operation of the bearing, said mass of grease being eccentrically located inside said cup and partly covering the blind end of said cup and said inner cylindrical face, so as to coat at least a part of the needles in a limited sector of said cup.

---

The present invention relates to the provision of grease, before assembly, in a needle bearing having one end closed, usually termed a needle cup, that is, a bearing consisting of a ring having a closed end or cup provided with needles and if desired a cage and other elements of utility for the operation of the bearing. The greasing of this bearing before assembly is usually provided by the manufacturer of the bearing and intended for the whole operational life of the bearing.

In this type of bearing, as for example employed in electric generators, the amount of grease placed in position must be strictly measured so that it is sufficient to lubricate the internal parts of the bearing throughout their life but produces no excess of grease in the course of the introduction of the shaft which is expelled from the bearing and soils for example the vital parts of the apparatus and, in the case under consideration, settles on the electrical parts of the element equipped with the bearing.

Two methods are employed at the present time, but both of them have serious drawbacks.

The first method consists in providing the blind end of the cup with such an amount of measured grease that the introduction of the shaft can only urge this grease towards the moving elements and the raceways if this shaft comes in contact with the layer of grease deposited on the blind end of the bearing. Now, as this shaft is elsewhere axially positioned, for example by a ball or other bearing, there always remains a deviation, due to the axial tolerances of the whole of the assembly, between the ends of the shaft and the blind end, since if in the course of assembly contact was systematically made with the end of the bearing, the effect of the tolerances would be to provide sometimes a clearance and sometimes a prestressing and local heating between the end of the shaft and the end of the cup and consequently its rapid destruction.

Consequently, the amount of grease urged toward the bearing is very variable and, if the clearance resulting from the tolerances is maximum, an insufficient amount of grease would be introduced between the moving elements. In the opposite case, there might be an excessive amount since, in any case, more or less of the grease (depending on the tolerances) would always remain adhering to the end wall of the bearing and would not serve for the operation of the bearing.

In another method, before assembly, the annular space between the inner raceway and the outer raceway of the bearing—which annular space contains the needles and if desired additional elements such as a cage etc.—is more or less completely filled with grease.

In this case, when the shaft is introduced into the bearing thus provided with grease, a pocket of air is trapped at the end and this air can only escape by expelling the grease.

If the bearing comprises sealing means on the open end thereof, these sealing means become deformed in allowing the grease to pass therethrough under the action of the shaft which acts as a piston. Moreover in mass-production, a rapid introduction of the shaft is impossible since the trapped air can only flow very slowly.

In all these cases, when it is necessary to employ a strictly measured amount of grease, the conditions of an effective long-life greasing cannot be satisfied.

According to the present invention, all these drawbacks are avoided by introducing the measured amount of grease near the end of the blind bearing, but in forming an eccentric mass thereof so that a large part of this mass of grease extends in the annular space as mentioned hereinbefore and covers, over a large sector, the ends of the moving elements and the outer raceway of the bearing. Thus, when the shaft is introduced, the air is easily expelled through the part of the annular space which is devoid of grease and, as soon as the bearing rotates, centrifugal force acts on the grease in contact with the moving elements and the cage, if employed, and constrains the grease to distribute itself between the moving elements, especially as the cohesion of the grease employed is very high, and the parts of grease driven by all the moving elements attract the major part of the grease which is out of contact with the moving elements and might still remain between the end of the shaft and the blind end of the bearing. In this way, it is possible to ensure a precise measuring of the grease with the certainty that the latter is not expelled from the bearing when assembling the shaft, that the shaft can be introduced easily without marked resistance and that this grease serves exactly for the purpose for which it is provided, that is to say, to coat the greased moving elements and the raceway and, incidently, the additional elements such as for example the cage, so as to ensure their correct operation. These types of bearings are moreover often employed at very high speed, for example in the alternators of automobiles in which speeds of 10,000–12,000 r.p.m. and more are current practice.

The part of grease which could possibly remain adhering to the end of the bearing becomes negligible and consequently a bearing is obtained which will operate with an amount of grease which is well defined within narrow limits irrespective of the tolerance in the axial direction of the end of the shaft and of the blind end of the cup.

Further features and advantages of the invention will be apparent from the ensuing description with reference to the accompanying drawing.

In the figure, a cup 1 is provided with an annular assembly of needles 2 contained in a cage 3 and lubricated by means of set or stiff grease 4 retained in the cup 1 by the sealing ring 6.

According to the invention, the grease 4 is placed in position inside the bearing, before the mounting of the latter in the mechanical system intended to receive it, in the form of an eccentric mass 7 which partly covers both the end wall 1a of the cup 1 and its cylindrical face 1b which constitutes the outer raceway of the needles 2. Consequently, in a certain sector m the needles 2 and the cage 3 are immersed in the grease 4 over a length which varies with the circumferential position the needles occupy in this sector.

When the shaft or the journal A is fitted into the cup 1 within the ring of needles 2 the air displaced by this introduction is immediately urged outwardly in the remaining sector *n* through clearances between the needles 2 and between the sealing ring 6 and the adjacent face of the shaft A.

When the shaft A is rotated, the movement of the needles 2 drives the grease 4 of the sector *m* into the sector *n* so that this grease is spread throughout the annular zone between the shaft A and the outer raceway 1*b*. The centrifugal force which acts on the grease contributes to a uniform axial and circumferential distribution of the lubricant.

Moreover, it will be observed that the fraction of the mass 7 of grease which might remain in contact with the end wall 1*a* of the cup without performing an active lubricating part owing to the clearance between this end wall and the end of the shaft A, is absolutely negligible.

Although a specific embodiment of the invention has been described, many modifications and changes may be made therein without departing from the scope of the invention as defined in the appended claims.

Having now described my invention what I claim as new and desire to secure by Letter Patent is:

1. A needle bearing structure comprising a cup having a blind end and an inner cylindrical face, needles inside the cup and a mass of grease necessary for operation of the bearing, said mass of grease being eccentrically located inside said cup and partly covering the blind end of said cup and said inner cylindrical face, so as to coat at least a part of the needles in a limited sector of said cup.

2. A needles bearing structure as claimed in claim 1, further comprising a cage inside said cup and guidingly cooperative with said needles.

References Cited
UNITED STATES PATENTS 2,976,091   3/1961   Miller _____ 308—212

MARTIN P. SCHWADRON, Primary Examiner

F. SUSKO, Assistant Examiner

U.S. Cl. X.R.

308—213